US012687137B2

(12) United States Patent
Hong et al.

(10) Patent No.: US 12,687,137 B2
(45) Date of Patent: Jul. 21, 2026

(54) TURBINE ASSEMBLY

(71) Applicant: KOREA AEROSPACE RESEARCH INSTITUTE, Daejeon (KR)

(72) Inventors: Soon Sam Hong, Daejeon (KR); Dae Jin Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 19/344,664

(22) Filed: Sep. 30, 2025

(65) Prior Publication Data

US 2026/0146575 A1     May 28, 2026

(30) Foreign Application Priority Data

Oct. 4, 2024     (KR) ........................ 10-2024-0134914

(51) Int. Cl.
| | |
|---|---|
| *F02K 9/48* | (2006.01) |
| *F01D 15/10* | (2006.01) |
| *F02C 6/14* | (2006.01) |
| *F02C 7/236* | (2006.01) |
| *F02K 9/64* | (2006.01) |
| *F02K 9/97* | (2006.01) |

(52) U.S. Cl.
CPC ................ *F02K 9/48* (2013.01); *F01D 15/10* (2013.01); *F02C 6/14* (2013.01); *F02C 7/236* (2013.01); *F02K 9/64* (2013.01); *F02K 9/972* (2013.01)

(58) Field of Classification Search
CPC .. F01D 15/10; F02C 6/14; F02C 7/236; F02K 9/46; F02K 9/48; F02K 9/64; F02K 9/972
See application file for complete search history.

(56) References Cited

U.S. PATENT DOCUMENTS

| | | | | |
|---|---|---|---|---|
| 4,073,138 A * | 2/1978 | Beichel | ..................... | F02K 9/48 |
| | | | | 60/245 |
| 4,771,600 A * | 9/1988 | Limerick | .................. | F02K 9/64 |
| | | | | 60/260 |
| 4,998,410 A * | 3/1991 | Martinez-Leon | ......... | F02K 9/48 |
| | | | | 60/260 |
| 6,226,980 B1 * | 5/2001 | Katorgin | .................. | F02K 9/95 |
| | | | | 60/258 |
| 2015/0000755 A1 * | 1/2015 | Hayoun | .................... | F17D 3/01 |
| | | | | 137/340 |
| 2017/0254296 A1 * | 9/2017 | Weldon | ..................... | F02K 9/97 |

FOREIGN PATENT DOCUMENTS

| | | | | |
|---|---|---|---|---|
| WO | WO-2016039993 A1 * | 3/2016 | ............... | F02K 9/48 |

* cited by examiner

*Primary Examiner* — Scott J Walthour

(74) *Attorney, Agent, or Firm* — Benesch Friedlander Coplan & Aronoff LLP

(57) ABSTRACT

The present disclosure relates to a turbine assembly including a turbo pump configured to pressurize an oxidant and fuel to a high pressure and supply the oxidant and fuel to a combustor, and more particularly, to a technology capable of recycling exhaust gas that has operated a turbine of a turbo pump.

8 Claims, 7 Drawing Sheets

Prior Art

TURBINE ASSEMBLY

CROSS-REFERENCE TO RELATED APPLICATIONS

This application claims benefit and priority to Korean Patent Application No. 10-2024-0134914, filed on Oct. 4, 2024, with the Korean Intellectual Property Office, the disclosure of which is incorporated herein in its entirety by reference.

TECHNICAL FIELD

The present disclosure relates to a turbine assembly including a turbo pump configured to pressurize an oxidant and fuel to a high pressure and supply the oxidant and fuel to a combustor, and more particularly, to a technology capable of recycling an exhaust gas that has operated a turbine of a turbo pump.

BACKGROUND

A liquid propellant rocket engine (hereinafter, referred to as a 'liquid rocket engine') generates thrust by expelling a high-speed, high-pressure gas, which is obtained by combusting an oxidant and fuel in a combustor, through a nozzle. The liquid rocket engine is used as a representative propulsion system for a rocket.

In order to implement stable combustion in the liquid rocket engine, the stored oxidant and fuel need to be pressurized to a high pressure and supplied to the combustor. To this end, a turbo pump is used.

FIG. 1 is a schematic view illustrating a liquid propellant rocket engine 10 using a turbo pump in the related art. As illustrated, the liquid propellant rocket engine includes a fuel supply line L1 and a fuel pump 12 configured to supply fuel to a combustor 11, an oxidant supply line L2 and an oxidant pump 13 configured to supply an oxidant to the combustor 11, and a turbo pump including a driving shaft 14 configured to operate the fuel pump 12 and the oxidant pump 13, a turbine 15, and a gas generation part 16.

In the liquid propellant rocket engine 10 configured as described above, the oxidant and fuel stored in the tank are pressurized by the pumps 12 and 13 and supplied to the combustor 11. In this case, in order to rotate a turbine 15 that is a driving source for the pumps 12 and 13, a part of the oxidant and a part of the fuel are combusted in a separate combustor 16 called a gas generator (or pre-burner), and a high-temperature, high-pressure gas generated by the combustion is supplied to the turbine 15 to rotate the turbine 15.

The power generation cycle of the liquid rocket engine is configured to discharge an exhaust gas, which has operated the turbine 15, to the outside. Even though the exhaust gas is still in a state with a high pressure and temperature, the exhaust gas is discharged to the outside in an intact manner, which causes a loss of energy.

SUMMARY

The present disclosure has been made in an effort to provide a turbine assembly capable of improving supply pressure of an oxidant or fuel, which is to be supplied to a pump, by using an exhaust gas that has operated a turbine of a turbo pump.

The present disclosure has also been made in an effort to provide a turbine assembly capable of generating electric power by operating an electric generator by using an exhaust gas that has operated a turbine of a turbo pump.

An embodiment of the present disclosure provides a turbine assembly including: a first propellant that is any one of an oxidant and fuel and is capable of catalytic decomposition; a second propellant that is the other of the oxidant and fuel; a combustor configured to generate a propulsive force by receiving and combusting the first and second propellants; a first supply line configured to supply the first propellant to the combustor; a second supply line configured to supply the second propellant to the combustor; a first pump provided in the first supply line and configured to pressurize the first propellant; a second pump provided in the second supply line and configured to pressurize the second propellant; a turbine configured to be operated by a high-temperature gas and connected to the first and second pumps through a driving shaft; a third supply line having a front end connected to a high-temperature gas supply means, and a rear end connected to the turbine to supply a high-temperature gas to the turbine; a first exhaust turbine configured to be operated by an exhaust gas discharged after operating the turbine; an energy storage part connected to the first exhaust turbine through a first exhaust driving shaft and configured to store at least a part of energy generated by the first exhaust turbine operated by the exhaust gas; and a fourth supply line having a front end connected to the turbine, and a rear end connected to the first exhaust turbine to supply the exhaust gas to the first exhaust turbine.

In addition, the energy storage part includes a second booster pump connected to the exhaust turbine through the first exhaust driving shaft, provided at a front end of the second supply line, and configured to increase supply pressure of the second propellant.

In addition, the energy storage part further includes a first booster pump provided at a front end of the first supply line and configured to increase supply pressure of the first propellant by using the stored energy.

In addition, the engine further includes: a second exhaust turbine configured to be operated by the exhaust gas discharged after operating the turbine; and a fifth supply line having a front end connected to the turbine, and a rear end connected to the second exhaust turbine to supply the exhaust gas to the second exhaust turbine, and the energy storage part further includes a second booster pump connected to the second exhaust turbine through a second exhaust driving shaft, provided at a front end of the second supply line, and configured to increase supply pressure of the second propellant.

In addition, the energy storage part further includes an electric generator connected to the first exhaust turbine through the first exhaust driving shaft.

The energy storage part of the turbine assembly according to another embodiment of the present disclosure is an electric generator configured to generate electrical energy by using the stored energy.

In addition, in a first embodiment, the high-temperature gas supply means includes: a gas generator configured to generate the high-temperature gas by receiving and combusting the first and second propellants; a first-first supply line branching off from the first supply line and having a rear end connected to the gas generator to supply the first propellant to the gas generator; and a second-first supply line branching off from the second supply line and having a rear end connected to the gas generator to supply the second propellant to the gas generator.

In addition, the second supply line of the engine further includes a heat exchange line configured to pass through an outer surface of the combustor so that the second propellant is heated by combustion heat of the combustor.

In addition, in a second embodiment, the high-temperature gas supply means includes a second-second supply line having a front end branching off from a rear end of the heat exchange line, and a rear end connected to the third supply line, such that a part of the high-temperature second propellant, which has passed through the combustor, is supplied to the turbine.

Further, in a third embodiment, the high-temperature gas supply means includes a sixth supply line having a front end connected to the combustor, and a rear end connected to the third supply line, such that a part of a high-temperature combustion gas combusted in the combustor is supplied to the turbine.

The liquid rocket engine of the present disclosure, which is configured as described above and utilizes the turbine exhaust gas, may improve the combustion performance by improving the suction performance of the pump by increasing the supply pressure of the oxidant or fuel, which is to be supplied to the oxidant pump or fuel pump, by using the discarded high-temperature, high-pressure exhaust gas.

Because the electric power may be generated by the discarded exhaust gas, a separate power generation facility is not required, thereby reducing the capacity of the equipped battery.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, the embodiments of the present disclosure will be described in detail with reference to the drawings.

Embodiment 1 (Oxidant Pressurization Type)

Figure 1:
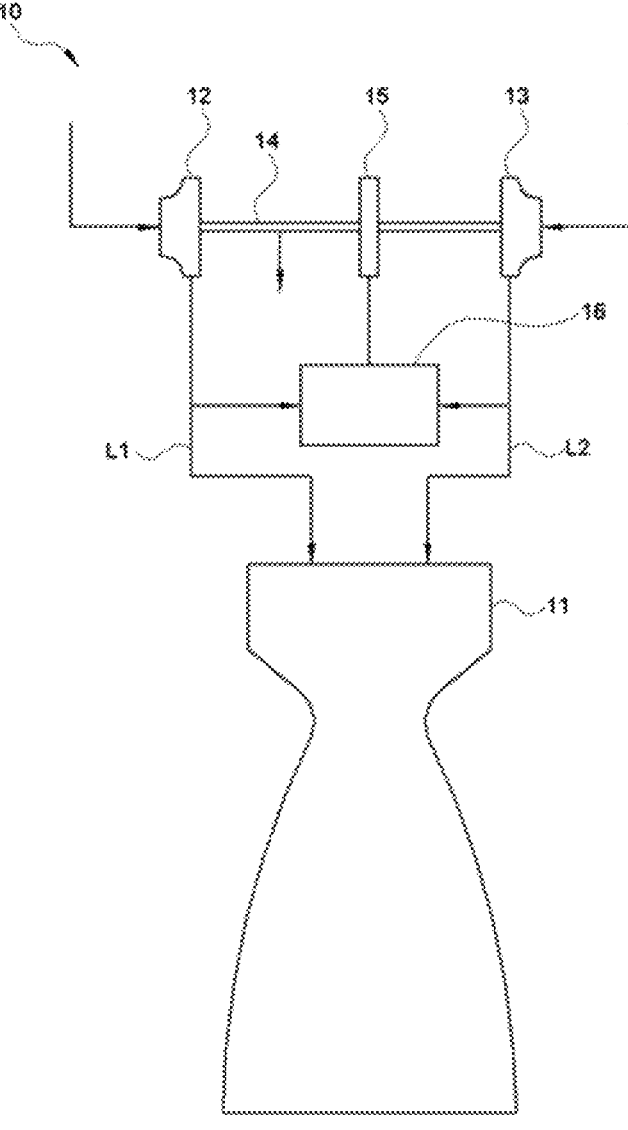
FIG. 1 is a schematic view of a turbine assembly using a turbo pump in the related art.
Figure 2:
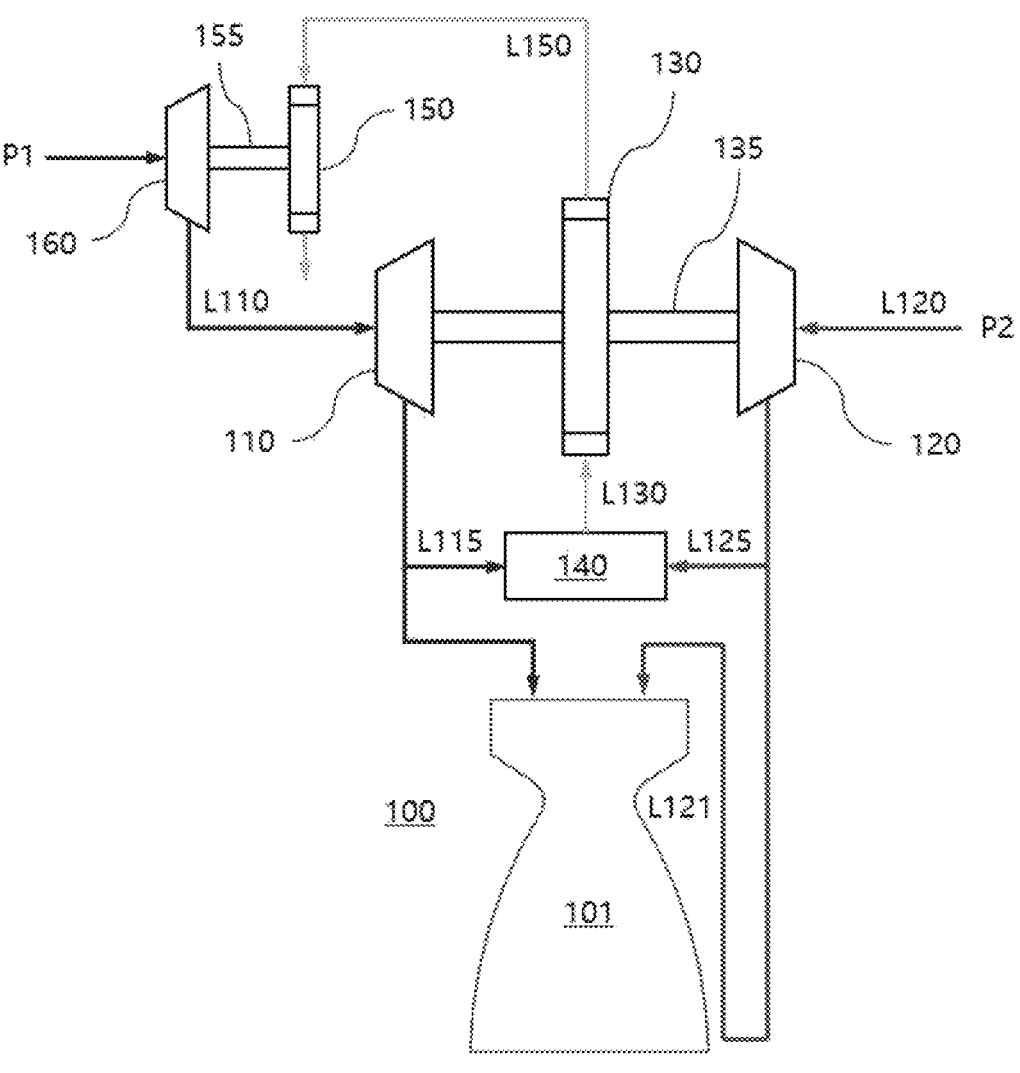
FIG. 2 is a schematic view of a turbine assembly of a first embodiment of the present disclosure.

FIG. 2 is a schematic view of a turbine assembly 100 of a first embodiment of the present disclosure.

As illustrated, the turbine assembly 100 includes a combustor 101, a first pump 110 configured to pump a first propellant P1, a second pump 120 configured to pump a second propellant P2, a turbine 130 configured to operate the first and second pumps 110 and 120, and a gas generator 140 configured to generate a driving gas for operating the turbine 130. For example, the turbine assembly 100 may be a liquid propellant rocket engine (liquid rocket engine). In the present specification, the turbine assembly may be referred to as an engine or a liquid rocket engine.

An engine 100 includes a first supply line L110 configured to supply the first propellant P1 to the combustor 101, a second supply line L120 configured to supply the second propellant P2 to the combustor 101, and a third supply line L130 configured to supply a high-temperature gas, which is generated by the gas generator 140, to the turbine 130. In addition, the engine 100 further includes a first-first supply line L115 branching off from the first supply line L110 and having a downstream side connected to the gas generator 140 in order to supply the first propellant P1 to the gas generator 140, and a second-first supply line L125 branching off from the second supply line L120 and having a downstream side connected to the gas generator 140 in order to supply the second propellant P2 to the gas generator 140.

The first pump 110 is provided in the first supply line L110 to pressurize the first propellant P1, and the second pump 120 is provided in the second supply line L120 to pressurize the second propellant P2.

The turbine 130 may be connected to the first and second pumps 110 and 120 through a driving shaft 135 and operate the first and second pumps 110 and 120 while rotating.

In this case, the first propellant P1 may be an oxidant for a liquid rocket engine, and the second propellant P2 may be fuel for a liquid rocket engine.

Meanwhile, the second supply line L120 further includes a heat exchange line L121 that passes through an outer surface of the combustor 101, such that the second propellant P2 may be heated by combustion heat of the combustor 101.

For example, the second propellant P2 may include liquid methane or hydrogen before the second propellant P2 passes through the outer surface of the combustor 101. In a detailed example, the liquid second propellant P2 may change in phase to a gaseous second propellant after passing through the outer surface of the combustor 101.

The combustor 101 may be provided in the form of a housing having a combustion space therein. The combustor 101 may be configured as a typical combustor for a liquid rocket engine that receives the liquid fuel and the oxidant and combusts the fuel to generate a propulsive force by using discharge pressure of a combustion gas.

A front end of the first supply line L110 is connected to a first propellant tank (not illustrated) and configured to be supplied with the first propellant P1, and a rear end of the first supply line L110 is connected to the combustor 101 and configured to supply the introduced first propellant P1 to the combustor 101. The first pump 110 is provided in the first supply line L110, such that the high-pressure first propellant P1 pressurized by the first pump 110 is supplied to the combustor 101.

A front end of the second supply line L120 is coupled to a second propellant tank (not illustrated) and configured to be supplied with the second propellant P2, and a rear end of the second supply line L120 is connected to the combustor 101 and configured to supply the introduced second propellant P2 to the combustor 101. The second pump 120 is provided in the second supply line L120, such that the high-pressure second propellant P2 pressurized by the second pump 120 is supplied to the combustor 101. In addition, the rear end of the second supply line L120 may be configured to pass through a wall surface of the combustor 101 such that the combustor 101 may be cooled, and simultaneously, the high-temperature, high-pressure fuel heated by the combustion heat of the combustor 101 may be supplied to the combustor 101.

A front end of the third supply line L130 is connected to the gas generator 140 and configured to be supplied with the high-temperature, high-pressure turbine driving gas generated by the gas generator 140, and a rear end of the third supply line L130 is connected to the turbine 130 and configured to rotate the turbine 130 by supplying the turbine driving gas to the turbine 130. The first and second pumps 110 and 120 are connected to the turbine 130 by the driving shaft 135 and operate by receiving a rotational force of the turbine 130 through the driving shaft 135.

In this case, the liquid rocket engine 100 of the first embodiment of the present disclosure has the following configuration to utilize the high-temperature, high-pressure exhaust gas that has operated the turbine 130.

The liquid rocket engine 100 includes an exhaust turbine 150 configured to be operated by the exhaust gas, and an energy storage part 160 connected to the exhaust turbine 150 through an exhaust driving shaft 155 and configured to store at least a part of the energy generated by the exhaust turbine 150 operated by the exhaust gas. The energy storage part 160 may be provided at the front end of the first supply line L110 and increase the supply pressure of the first propellant P1 while rotating. The energy storage part 160 may be referred to as a 'booster pump 160'. In addition, the liquid rocket engine 100 includes a fourth supply line L150 having a front end connected to the turbine 130 to receive the high-temperature, high-pressure exhaust gas, and a rear end connected to the exhaust turbine 150 to supply the high-temperature, high-pressure exhaust gas to the exhaust turbine 150.

The liquid rocket engine 100 may further include a propellant supplier configured to supply the first propellant P1 to the booster pump 160. Meanwhile, the propellant supplier may be provided as a component included in the liquid rocket engine 100, or the propellant supplier may be provided as a component provided separately from the liquid rocket engine 100. In case that the propellant supplier and the liquid rocket engine 100 are provided as separate components, the concept including both the propellant supplier and the liquid rocket engine 100 according to the present disclosure may be referred to as a 'liquid rocket'.

The propellant supplier may include a propellant tank configured to store the first propellant P1 therein, and a propellant flow path configured to allow the propellant tank and the booster pump 160 to communicate with each other. The pressure of the first propellant P1 supplied from the propellant tank may be raised by the booster pump 160. Therefore, the first propellant P1 to be supplied to the first supply line L110 may reach a target pressure by the booster pump 160, such that the internal pressure of the propellant tank may be low. That is, the target pressure may be defined as a sum of a value of the internal pressure of the propellant tank and a value of the pressure raised by the booster pump 160. As described above, the pressure of the first propellant P1 may reach the target pressure by the booster pump 160 so that the value of the internal pressure of the propellant tank may be lower than that of the target pressure, thereby minimizing a thickness of the propellant tank (a thickness of the propellant tank for withstanding the internal pressure).

Therefore, the weight of the propellant tank is minimized, thereby maximizing operational efficiency of the liquid rocket.

Therefore, the liquid rocket engine 100 of the present disclosure may improve combustion performance by improving suction performance of an oxidant pump by increasing the supply pressure of the oxidant, which is to be supplied to the oxidant pump, by using the discarded high-temperature, high-pressure exhaust gas.

Embodiment 2 (Fuel Pressurization Type) (Gas Generator Type)

Figure 3:
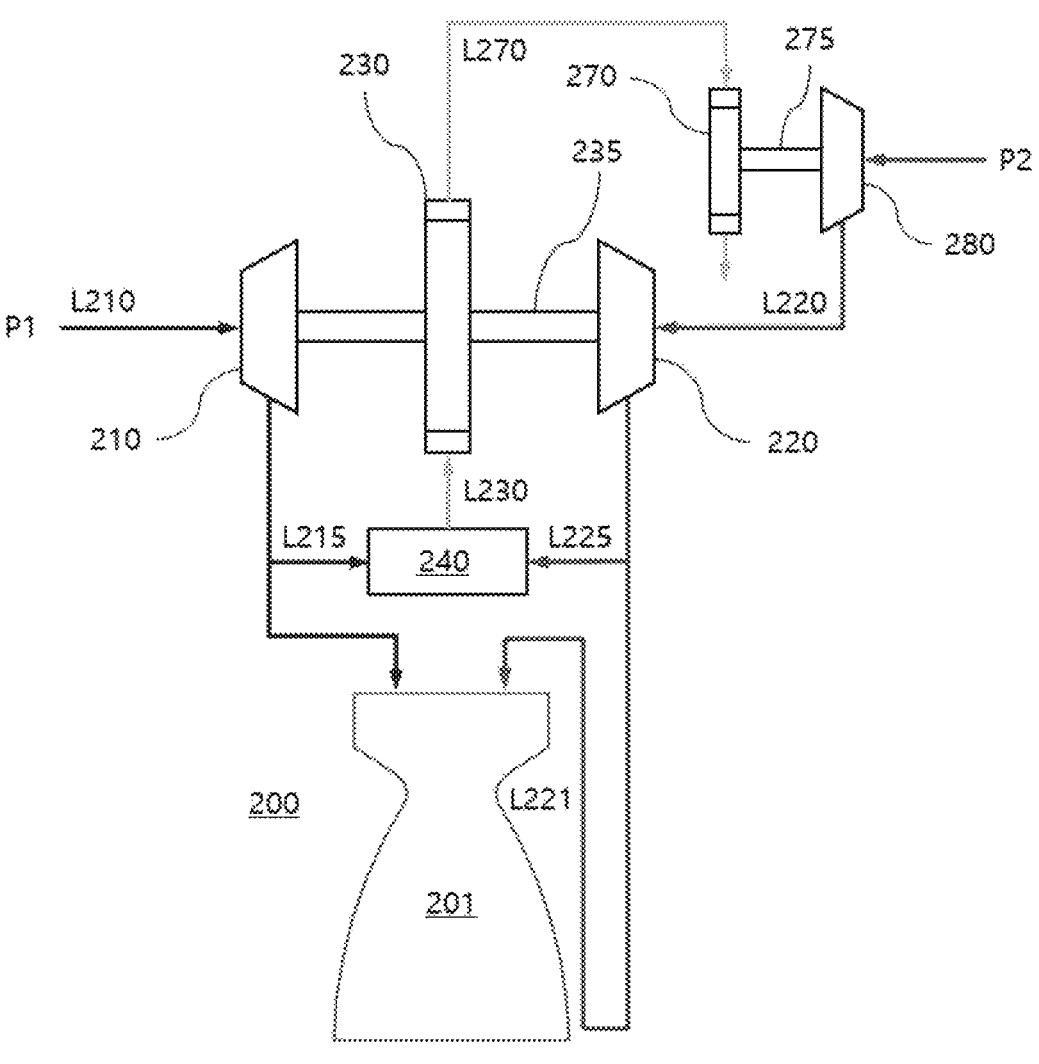
FIG. 3 is a schematic view of a turbine assembly of a second embodiment of the present disclosure.

FIG. 3 is a schematic view of a turbine assembly 200 of a second embodiment of the present disclosure.

As illustrated, the liquid rocket engine 200 includes a combustor 201, a first pump 210 configured to pump the first propellant P1, a second pump 220 configured to pump the second propellant P2, a turbine 230 connected to first and second pumps 210 and 220 through a driving shaft 235, and a gas generator 240 configured to generate a driving gas for operating the turbine 230. In addition, the liquid rocket engine 200 includes a first supply line L210 configured to supply the first propellant P1 to the combustor 201, a second supply line L220 configured to supply the second propellant P2 to the combustor 201, and a third supply line L230 configured to supply a high-temperature gas, which is generated by the gas generator 240, to the turbine 230. In addition, the liquid rocket engine 200 further includes a first-first supply line L215 configured to supply the first propellant P1 to the gas generator 240, a second-first supply line L225 configured to supply the second propellant P2 to the gas generator 240, and a heat exchange line L221 provided in the second supply line L220 and configured to pass through an outer surface of the combustor 201.

Because a detailed configuration of the above-mentioned configuration of the liquid rocket engine 200 according to the second embodiment of the present disclosure is identical to that of the liquid rocket engine 100 according to the first embodiment, a description thereof will be omitted.

In this case, the liquid rocket engine 200 of the second embodiment of the present disclosure has the following configuration to utilize the high-temperature, high-pressure exhaust gas that has operated the turbine 230.

The liquid rocket engine 200 includes an exhaust turbine 270 configured to be operated by the exhaust gas, and a booster pump 280 connected to the exhaust turbine 270 through an exhaust driving shaft 275, provided at a front end of the second supply line L220, and configured to increase the supply pressure of the second propellant P2 while rotating. In addition, the liquid rocket engine 200 includes a fifth supply line L270 having a front end connected to the turbine 230 to receive the high-temperature, high-pressure exhaust gas, and a rear end connected to the exhaust turbine 270 to supply the high-temperature, high-pressure exhaust gas to the exhaust turbine 270.

Therefore, the liquid rocket engine 200 of the present disclosure may improve combustion performance by improving suction performance of a fuel pump by increasing the supply pressure of the fuel, which is to be supplied to the fuel pump, by using the discarded high-temperature, high-pressure exhaust gas.

Embodiment 3 (Simultaneous Oxidant and Fuel Pressurization Type) (Gas Generator Type)

Figure 4:
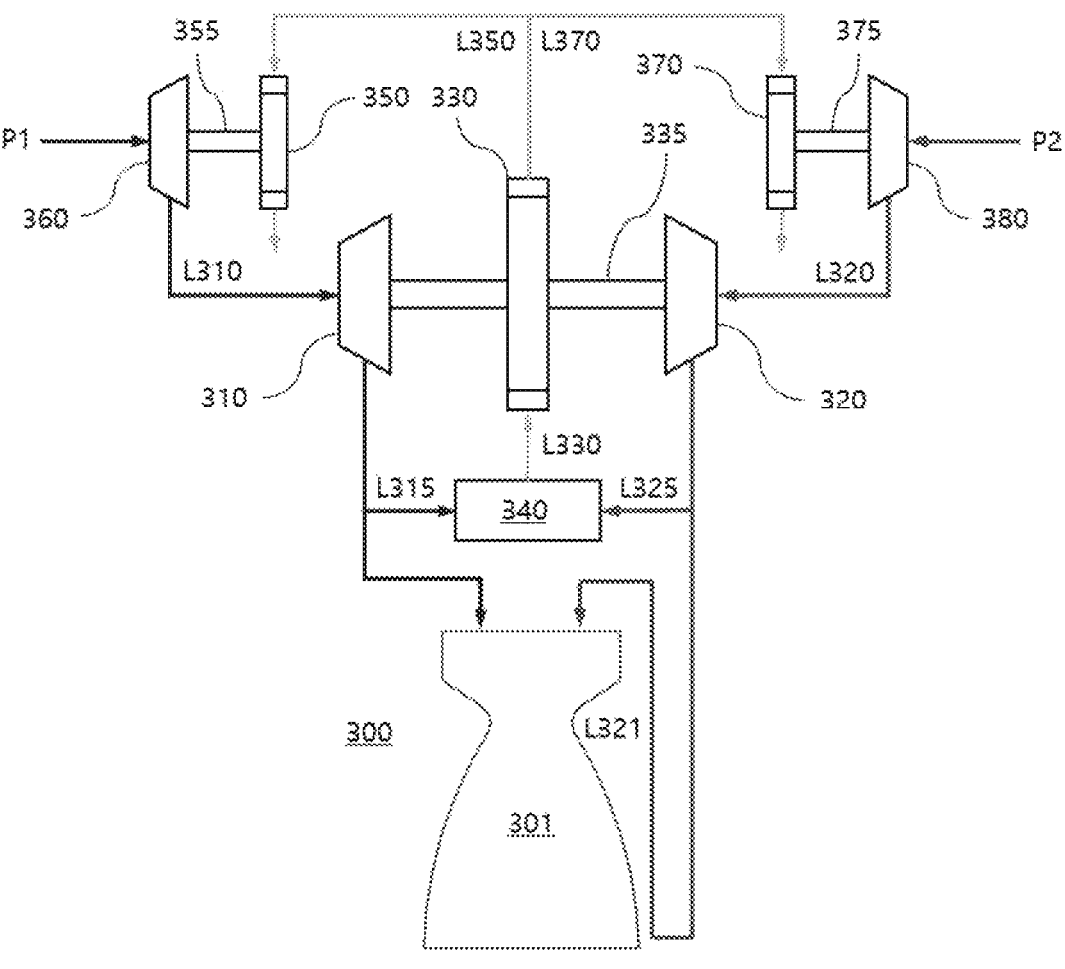
FIG. 4 is a schematic view of a turbine assembly of a third embodiment of the present disclosure.

FIG. 4 is a schematic view of a turbine assembly 300 of a third embodiment of the present disclosure.

As illustrated, the liquid rocket engine 300 includes a combustor 301, a first pump 310 configured to pump the first propellant P1, a second pump 320 configured to pump the second propellant P2, a turbine 330 connected to first and second pumps 310 and 320 through a driving shaft 335, and a gas generator 340 configured to generate a driving gas for operating the turbine 330. In addition, the liquid rocket engine 300 includes a first supply line L310 configured to supply the first propellant P1 to the combustor 301, a second supply line L320 configured to supply the second propellant P2 to the combustor 301, and a third supply line L330 configured to supply a high-temperature gas, which is generated by the gas generator 340, to the turbine 330. In addition, the liquid rocket engine 300 further includes a first-first supply line L315 configured to supply the first propellant P1 to the gas generator 340, a second-first supply line L325 configured to supply the second propellant P2 to the gas generator 340, and a heat exchange line L321 provided in the second supply line L320 and configured to pass through an outer surface of the combustor 301.

Because a detailed configuration of the above-mentioned configuration of the liquid rocket engine 300 according to the third embodiment of the present disclosure is identical to that of the liquid rocket engine 100 or 200 according to the first or second embodiment, a description thereof will be omitted.

In this case, the liquid rocket engine 300 of the third embodiment of the present disclosure has the following configuration to utilize the high-temperature, high-pressure exhaust gas that has operated the turbine 330.

The liquid rocket engine 300 includes a first exhaust turbine 350 configured to be operated by the exhaust gas, and energy storage parts 360 and 380 including a first booster pump 360 connected to the first exhaust turbine 350 through a first exhaust driving shaft 355, provided at a front end of the first supply line L310, and configured to increase the supply pressure of the first propellant P1 while rotating. In addition, the liquid rocket engine 300 includes a fourth supply line L350 having a front end connected to the turbine 330 to receive the high-temperature, high-pressure exhaust gas, and a rear end connected to the first exhaust turbine 350 to supply the high-temperature, high-pressure exhaust gas to the first exhaust turbine 350.

In addition, the energy storage parts 360 and 380 further include a second exhaust turbine 370 configured to be operated by the exhaust gas, and a second booster pump 380 connected to the second exhaust turbine 370 through a second exhaust driving shaft 375, provided at a front end of the second supply line L320, and configured to increase the supply pressure of the second propellant P2 while rotating. In addition, the liquid rocket engine 300 includes a fifth supply line L370 having a front end connected to the turbine 330 to receive the high-temperature, high-pressure exhaust gas, and a rear end connected to the second exhaust turbine 370 to supply the high-temperature, high-pressure exhaust gas to the second exhaust turbine 370.

Meanwhile, the first and second exhaust turbines 350 and 370 may be configured as a single exhaust turbine, the first and second exhaust driving shafts 355 and 375 may be configured as a single driving shaft, and the single exhaust turbine may be connected to the first and second booster pumps 360 and 380 through the single driving shaft. Therefore, the fourth and fifth supply lines L350 and L370 may also be configured as a single supply line.

Therefore, the liquid rocket engine 300 of the present disclosure may further improve combustion performance by improving suction performance of the oxidant pump and the fuel pump by increasing the supply pressure of the oxidant and fuel, which is to be supplied to the oxidant pump and the fuel pump, by using the discarded high-temperature, high-pressure exhaust gas.

Embodiment 4 (Power Generation Type) (Gas Generator Type)

Figure 5:
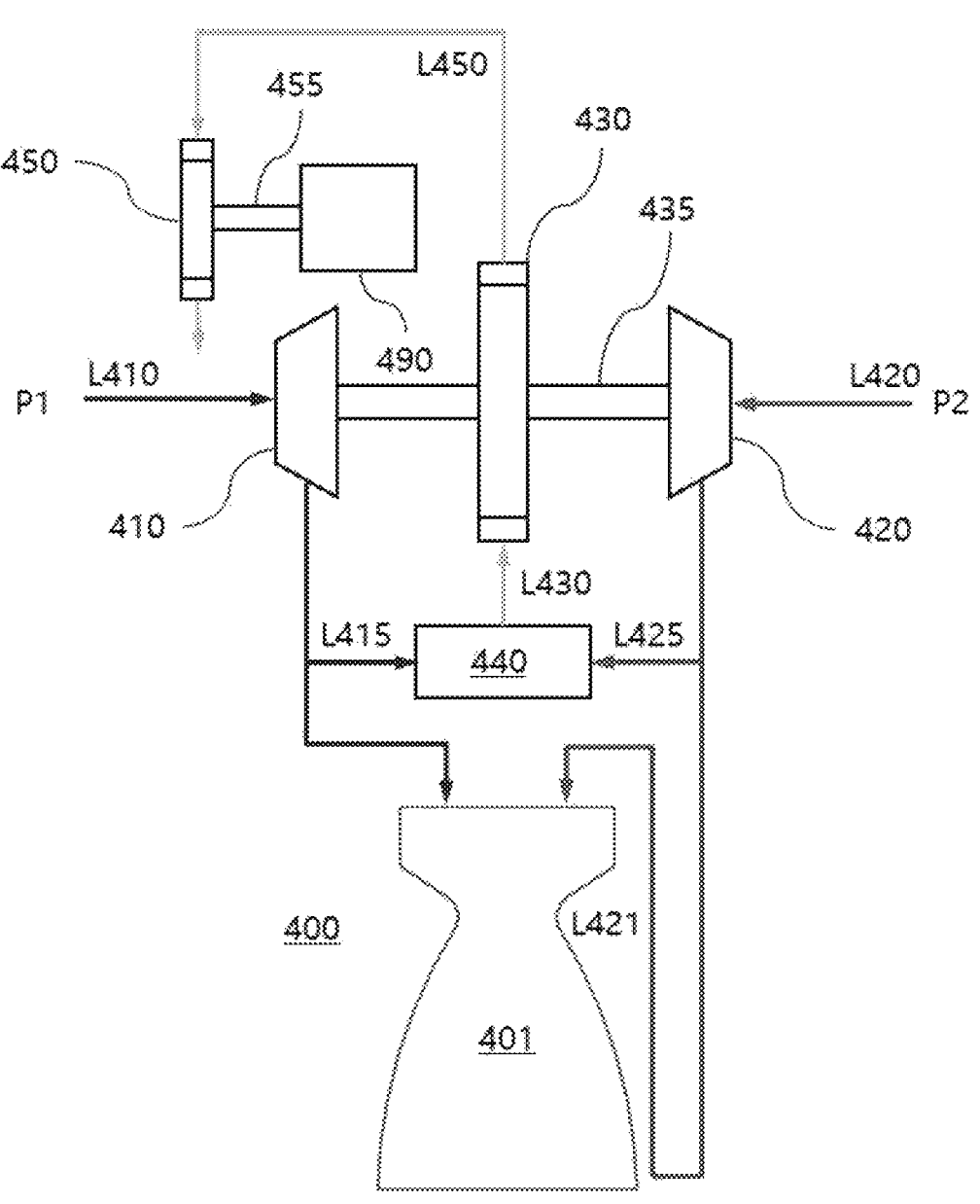
FIG. 5 is a schematic view of a turbine assembly of a fourth embodiment of the present disclosure.

FIG. 5 is a schematic view of a turbine assembly 400 of a fourth embodiment of the present disclosure.

As illustrated, the liquid rocket engine 400 includes a combustor 401, a first pump 410 configured to pump the first propellant P1, a second pump 420 configured to pump the second propellant P2, a turbine 430 connected to first and second pumps 410 and 420 through a driving shaft 435, and a gas generator 440 configured to generate a driving gas for operating the turbine 430. In addition, the liquid rocket engine 400 includes a first supply line L410 configured to supply the first propellant P1 to the combustor 401, a second supply line L420 configured to supply the second propellant P2 to the combustor 401, and a third supply line L430 configured to supply a high-temperature gas, which is generated by the gas generator 440, to the turbine 430. In addition, the liquid rocket engine 400 further includes a first-first supply line L415 configured to supply the first propellant P1 to the gas generator 440, a second-first supply line L425 configured to supply the second propellant P2 to the gas generator 440, and a heat exchange line L421 provided in the second supply line L420 and configured to pass through an outer surface of the combustor 401.

Because a detailed configuration of the above-mentioned configuration of the liquid rocket engine 400 according to the fourth embodiment of the present disclosure is identical to those of the liquid rocket engines 100, 200, and 300 according to the first to third embodiments, a description thereof will be omitted.

In this case, the liquid rocket engine 400 of the fourth embodiment of the present disclosure has the following configuration to utilize the high-temperature, high-pressure exhaust gas that has operated the turbine 430.

The liquid rocket engine 400 includes an energy storage part 490 configured to store at least a part of energy generated by an exhaust turbine 450 operated by the exhaust gas. The energy storage part 490 may be provided as an electric generator 490 connected to the exhaust turbine 450 through an exhaust driving shaft 455, and the exhaust turbine 450 is operated by the exhaust gas. The energy storage part 490 may be referred to as the 'electric generator 490'. That is, the electric generator 490 may generate electrical energy by using the stored energy. In addition, the liquid rocket engine 400 includes a fourth supply line L450 having a front end connected to the turbine 430 to receive the high-temperature, high-pressure exhaust gas, and a rear end connected to the exhaust turbine 450 to supply the high-temperature, high-pressure exhaust gas to the exhaust turbine 450. The electricity generated by the electric generator 490 may be stored in a rechargeable battery or supplied to an electronic device that requires electricity.

Therefore, the liquid rocket engine 400 of the present disclosure may generate electric power by using the discarded high-temperature, high-pressure exhaust gas, such that an additional power generation facility may be excluded, thereby reducing the volume or weight and reducing a capacity of the battery.

In addition, the exhaust turbine 450 may be connected to the booster pump 160 or 280 of the first or second embodiment and configured to simultaneously operate the electric generator 490 and operate the booster pump 160 or 280 of the first or second embodiment.

Embodiment 5 (Oxidant Pressurization Type)
(Expansion Gas Jet Type)

Figure 6:
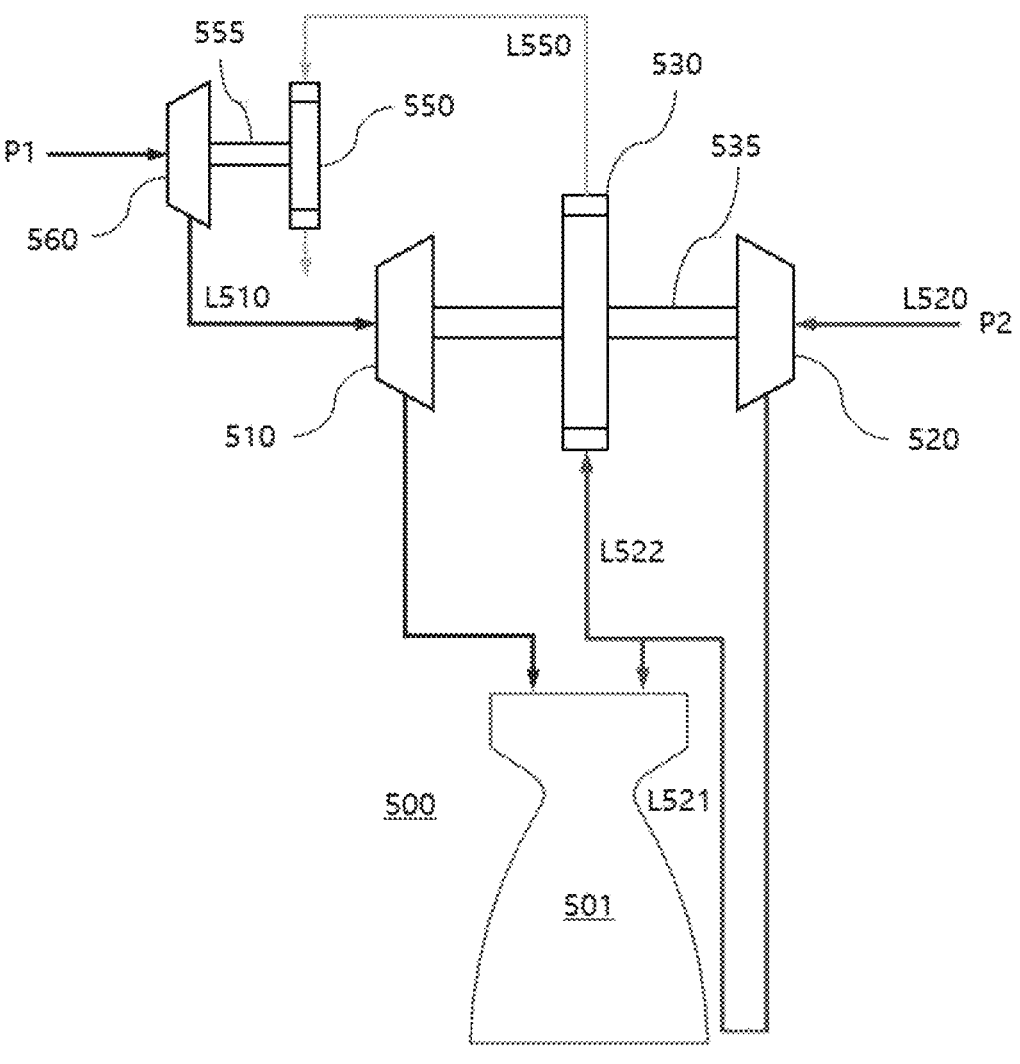
FIG. 6 is a schematic view of a turbine assembly of a fifth embodiment of the present disclosure.

FIG. 6 is a schematic view of a turbine assembly 500 of a fifth embodiment of the present disclosure. (The configuration for supplying the turbine driving gas to the turbine by using the gas generator is disclosed in the first embodiment. However, in the present embodiment, a configuration, which heats and expands a part of the fuel in the combustor and utilizes the fuel as the turbine driving gas, is illustrated.)

As illustrated, the liquid rocket engine 500 includes a combustor 501, a first pump 510 configured to pump the first propellant P1, a second pump 520 configured to pump the second propellant P2, and a turbine 530 configured to operate the first and second pumps 510 and 520. In addition, the engine 500 includes a first supply line L510 configured to supply the first propellant P1 to the combustor 501, and a second supply line L520 configured to supply the second propellant P2 to the combustor 501. In this case, the second supply line L520 further includes a heat exchange line L521 that passes through an outer surface of the combustor 501, such that the second propellant P2 may be heated by combustion heat of the combustor 501.

Meanwhile, the engine 500 may further include a second-second supply line L522 having a front end branching off from a rear end of the heat exchange line L521, and a rear end connected to the turbine 530, such that a part of the high-temperature, high-pressure second propellant P2, which has passed through the combustor 501, is supplied to the turbine 530.

Because a detailed configuration of the above-mentioned configuration of the liquid rocket engine 500 according to the fifth embodiment of the present disclosure is identical to that of the liquid rocket engine 100 according to the first embodiment, a description thereof will be omitted.

In this case, the liquid rocket engine 500 of the fifth embodiment of the present disclosure has the following configuration to utilize the high-temperature, high-pressure exhaust gas that has operated the turbine 530.

The liquid rocket engine 500 includes an exhaust turbine 550 configured to be operated by the exhaust gas, and an energy storage part 560 connected to the exhaust turbine 550 through an exhaust driving shaft 555 and configured to store at least a part of energy generated by the exhaust turbine 550 operated by the exhaust gas. The energy storage part 560 may be provided at the front end of the first supply line L510 and increase the supply pressure of the first propellant P1 while rotating. The energy storage part 560 may be referred to as a 'booster pump 560'. In addition, the liquid rocket engine 500 includes a fourth supply line L550 having a front end connected to the turbine 530 to receive the high-temperature, high-pressure exhaust gas, and a rear end connected to the exhaust turbine 550 to supply the high-temperature, high-pressure exhaust gas to the exhaust turbine 550.

Therefore, the liquid rocket engine 500 of the present disclosure may improve combustion performance by improving suction performance of an oxidant pump by increasing the supply pressure of the oxidant, which is to be supplied to the oxidant pump, by using the discarded high-temperature, high-pressure exhaust gas.

Further, it is apparent that the method of supplying the turbo driving gas of the liquid rocket engine of the second to fourth embodiments may be replaced with the expansion gas jet type of the fifth embodiment.

Embodiment 6 (Oxidant Pressurization Type)
(Combustion Gas Jet Type)

Figure 7:
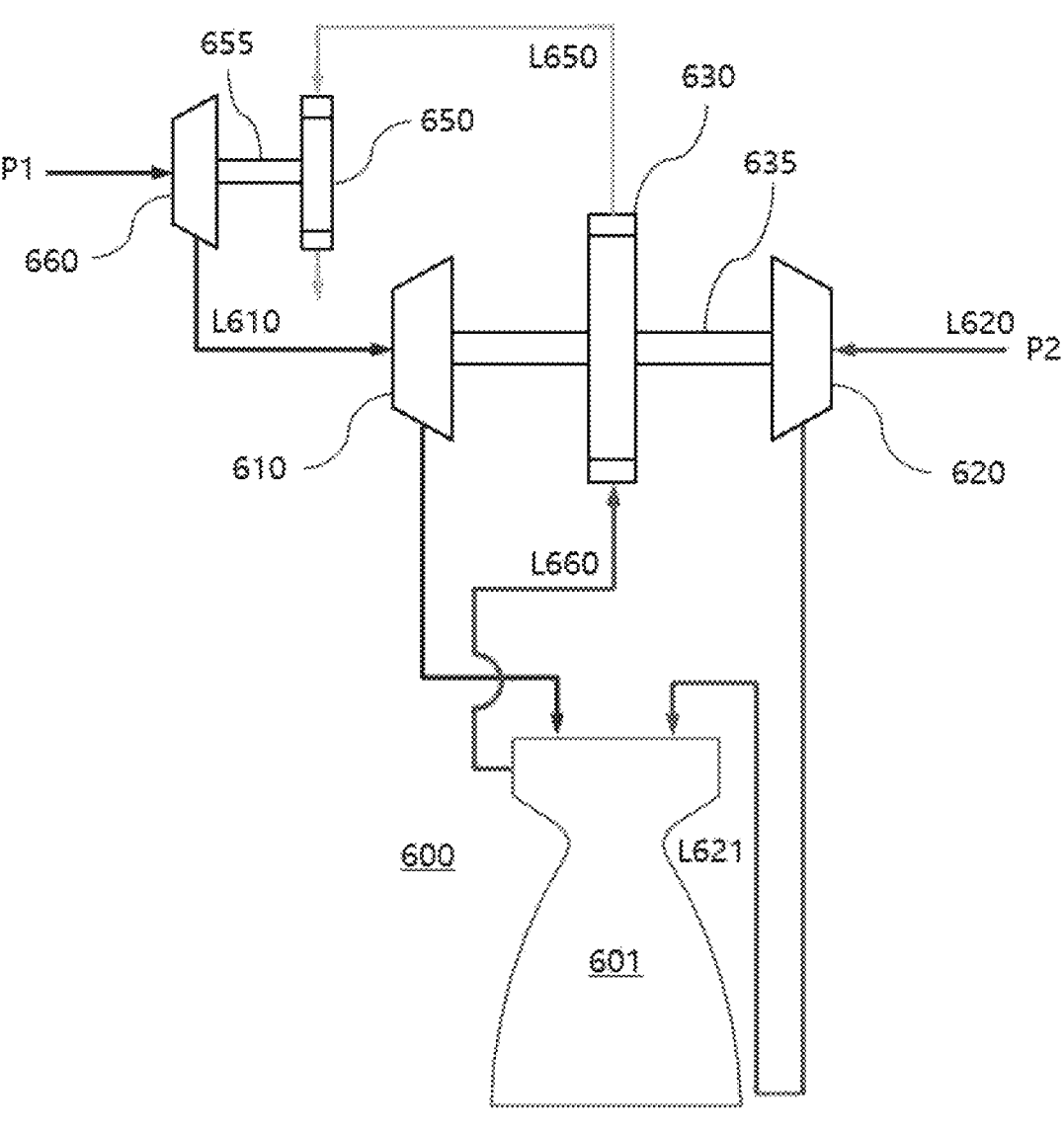
FIG. 7 is a schematic view of a turbine assembly of a sixth embodiment of the present disclosure.

FIG. 7 is a schematic view of a turbine assembly 600 of a sixth embodiment of the present disclosure. (The configuration for supplying the turbine driving gas to the turbine by using the gas generator is disclosed in the first embodiment. However, in the present embodiment, a configuration, in which a part of the combustion gas combusted in the combustor is utilized as the turbine driving gas, is illustrated.)

As illustrated, the liquid rocket engine 600 includes a combustor 601, a first pump 610 configured to pump the first propellant P1, a second pump 620 configured to pump the second propellant P2, and a turbine 630 configured to operate the first and second pumps 610 and 620. In addition, the engine 600 includes a first supply line L610 configured to supply the first propellant P1 to the combustor 601, and a second supply line L620 configured to supply the second propellant P2 to the combustor 601. In this case, the second supply line L620 further includes a heat exchange line L621 that passes through an outer surface of the combustor 601, such that the second propellant P2 may be heated by combustion heat of the combustor 601.

Meanwhile, the engine 600 may further include a sixth supply line L660 having a front end connected to the combustor 601, and a rear end connected to the turbine 630, such that a part of the high-temperature, high-pressure combustion gas combusted in the combustor 601 is supplied to the turbine 630.

Because a detailed configuration of the above-mentioned configuration of the liquid rocket engine 600 according to the sixth embodiment of the present disclosure is identical to that of the liquid rocket engine 100 according to the first embodiment, a description thereof will be omitted.

In this case, the liquid rocket engine 600 of the sixth embodiment of the present disclosure has the following configuration to utilize the high-temperature, high-pressure exhaust gas that has operated the turbine 630.

The liquid rocket engine 600 includes an exhaust turbine 650 configured to be operated by the exhaust gas, and an energy storage part 660 connected to the exhaust turbine 650 through an exhaust driving shaft 655 and configured to store at least a part of energy generated by the exhaust turbine 650 operated by the exhaust gas. The energy storage part 660 may be provided at the front end of the first supply line L610 and increase the supply pressure of the first propellant P1 while rotating. The energy storage part 660 may be referred to as a 'booster pump 660'. In addition, the liquid rocket engine 600 includes a fourth supply line L650 having a front end connected to the turbine 630 to receive the high-temperature, high-pressure exhaust gas, and a rear end connected to the exhaust turbine 650 to supply the high-temperature, high-pressure exhaust gas to the exhaust turbine 650.

Therefore, the liquid rocket engine 600 of the present disclosure may improve combustion performance by improving suction performance of an oxidant pump by increasing the supply pressure of the oxidant, which is to be supplied to the oxidant pump, by using the discarded high-temperature, high-pressure exhaust gas.

Further, it is apparent that the method of supplying the turbo driving gas of the liquid rocket engine of the second to fourth embodiments may be replaced with the combustion gas jet type of the sixth embodiment.

The technical spirit should not be construed as being limited to the embodiments of the present disclosure. Of course, the scope of application is diverse, and various modifications and implementations may be made by those skilled in the art without departing from the subject matter of the present disclosure claimed in the claims. Accordingly, these improvements and modifications will fall within the scope of the present disclosure as long as they are apparent to those skilled in the art.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A turbine assembly comprising:
a first propellant that is any one of an oxidant and a fuel and is capable of catalytic decomposition;
a second propellant that is the other of the oxidant and the fuel;
a combustor configured to generate a propulsive force by receiving and combusting the first and second propellants;
a first supply line configured to supply the first propellant to the combustor;
a second supply line configured to supply the second propellant to the combustor;
a first pump provided in the first supply line and configured to pressurize the first propellant;
a second pump provided in the second supply line and configured to pressurize the second propellant;
a turbine configured to be operated by a high-temperature gas and connected to the first and second pumps through a driving shaft;
a third supply line having a front end connected to a high-temperature gas supply means, and a rear end connected to the turbine to supply the high-temperature gas to the turbine;
a first exhaust turbine configured to be operated by an exhaust gas discharged after operating the turbine;
a first booster pump connected to the first exhaust turbine through a first exhaust driving shaft, provided at a front end of the first supply line and configured to increase supply pressure of the first propellant by using an energy generated by the first exhaust turbine operated by the exhaust gas; and
a fourth supply line having a front end connected to the turbine, and a rear end connected to the first exhaust turbine to supply the exhaust gas to the first exhaust turbine.

2. The turbine assembly of claim 1, further comprising a second booster pump connected to the first exhaust turbine through the first exhaust driving shaft, provided at a front end of the second supply line, and configured to increase supply pressure of the second propellant.

3. The turbine assembly of claim 1, further comprising:
a second exhaust turbine configured to be operated by the exhaust gas discharged after operating the turbine;
a fifth supply line having a front end connected to the turbine, and a rear end connected to the second exhaust turbine to supply the exhaust gas to the second exhaust turbine, and
a second booster pump connected to the second exhaust turbine through a second exhaust driving shaft, provided at a front end of the second supply line, and configured to increase supply pressure of the second propellant.

4. The turbine assembly of claim 1, further comprising an electric generator connected to the first exhaust turbine through the first exhaust driving shaft.

5. The turbine assembly of claim 1, wherein the high-temperature gas supply means comprises:
a gas generator configured to generate the high-temperature gas by receiving and combusting the first and second propellants;
a first-first supply line branching off from the first supply line and having a rear end connected to the gas generator to supply the first propellant to the gas generator; and
a second-first supply line branching off from the second supply line and having a rear end connected to the gas generator to supply the second propellant to the gas generator.

6. The turbine assembly of claim 1, wherein the second supply line further comprises a heat exchange line configured to pass through an outer surface of the combustor so that the second propellant is heated by combustion heat of the combustor.

7. The turbine assembly of claim 6, wherein the high-temperature gas supply means comprises a second-second supply line having a front end branching off from a rear end of the heat exchange line, and a rear end of the second-second supply line is connected to the third supply line, such that a part of the high-temperature second propellant, which has passed through the combustor, is supplied to the turbine.

8. The turbine assembly of claim 1, wherein the high-temperature gas supply means comprises a sixth supply line having a front end connected to the combustor, and a rear end connected to the third supply line, such that a part of a high-temperature combustion gas combusted in the combustor is supplied to the turbine.

* * * * *